United States Patent
Tsuchida (10) Patent No.: US 10,900,696 B2
(45) Date of Patent: Jan. 26, 2021

(54) ELECTRIC MOTOR FOR COMPRESSOR, COMPRESSOR, AND REFRIGERATION CYCLE DEVICE

(71) Applicant: Mitsubishi Electric Corporation, Tokyo (JP)

(72) Inventor: Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 15/556,349

(22) PCT Filed: Jun. 9, 2015

(86) PCT No.: PCT/JP2015/066622
§ 371 (c)(1),
(2) Date: Sep. 7, 2017

(87) PCT Pub. No.: WO2016/199226
PCT Pub. Date: Dec. 15, 2016

(65) Prior Publication Data
US 2018/0106513 A1    Apr. 19, 2018

(51) Int. Cl.
*F25B 31/02* (2006.01)
*H02K 21/14* (2006.01)
(Continued)

(52) U.S. Cl.
CPC ............ *F25B 31/023* (2013.01); *F04B 39/00* (2013.01); *F04C 29/0057* (2013.01);
(Continued)

(58) Field of Classification Search
CPC ...... F25B 31/023; H02K 21/16; H02K 1/278; H02K 21/14; F04C 29/0057;
(Continued)

(56) References Cited

U.S. PATENT DOCUMENTS 6,897,588 B2   5/2005   Okubo
8,004,139 B2   8/2011   Kataoka et al.
(Continued)

FOREIGN PATENT DOCUMENTS

EP   2 073 350 A   6/2009
JP   60-176432 A   9/1985
(Continued)

OTHER PUBLICATIONS

Extended European Search Report dated Dec. 17, 2018 issued in corresponding European patent application No. 15894911.5.
(Continued)

*Primary Examiner* — Shawki S Ismail
*Assistant Examiner* — Htet Z Kyaw
(74) *Attorney, Agent, or Firm* — Posz Law Group, PLC (57) ABSTRACT

An electric motor includes a stator core formed by stacking a plurality of electromagnetic steel sheets, a rotor core provided on an inner side of the stator core and formed by stacking a plurality of electromagnetic steel sheets, a rotating shaft having one end side inserted into the rotor core, and an eccentric portion provided on another end side of the rotating shaft and placed in a compression mechanism, in which a length from a center of the rotor core in an axial direction of the rotor core to an end face of the rotor core in the axial direction of the rotor core is shorter than a length from a center of the stator core in an axial direction of the stator core to an end face of the stator core in the axial direction of the stator core.

6 Claims, 9 Drawing Sheets

(51) Int. Cl.
| | |
|---|---|
| *F04B 39/00* | (2006.01) |
| *F04C 29/00* | (2006.01) |
| *H02K 1/27* | (2006.01) |
| *H02K 21/16* | (2006.01) |
| *F04B 39/08* | (2006.01) |

(52) U.S. Cl.
CPC ............. *H02K 1/278* (2013.01); *H02K 21/14* (2013.01); *H02K 21/16* (2013.01); *F04B 39/08* (2013.01); *F04C 2240/60* (2013.01); *F04C 2240/807* (2013.01)

(58) Field of Classification Search
CPC ................... F04C 2240/807; F04C 2240/60; F04B 39/00; F04B 39/08
USPC ............................................. 310/52
See application file for complete search history.

(56) References Cited

U.S. PATENT DOCUMENTS

| | | | |
|---|---|---|---|
| 8,179,016 | B2 | 5/2012 | Asano |
| 8,821,143 | B2 | 9/2014 | Takahashi et al. |
| 2004/0195926 | A1* | 10/2004 | Hiwaki .................. H02K 1/146 310/214 |
| 2008/0145252 | A1 | 6/2008 | Ku et al. |
| 2010/0061868 | A1 | 3/2010 | Kojima |
| 2016/0197541 | A1 | 7/2016 | Okubo et al. |
| 2016/0329784 | A1* | 11/2016 | Tamura .................. H02K 1/276 |
| 2017/0082329 | A1* | 3/2017 | Tsuchida ............... F25B 31/026 |
| 2017/0222528 | A1* | 8/2017 | Tsuchida ................ H02K 21/16 |
| 2018/0066873 | A1* | 3/2018 | Maeyama ............ F04C 18/344 |
| 2018/0248426 | A1* | 8/2018 | Nigo ........................ H02K 1/22 |
| 2019/0081521 | A1* | 3/2019 | Baba ........................ H02K 1/02 |

FOREIGN PATENT DOCUMENTS

| | | |
|---|---|---|
| JP | 2001-349284 A | 12/2001 |
| JP | 2004-194489 A | 7/2004 |
| JP | 2004-357430 A | 12/2004 |
| JP | 4172514 B2 | 8/2008 |
| JP | 41725814 B2 | 10/2008 |
| JP | 2010-051150 A | 3/2010 |
| JP | 2012-231586 A | 11/2012 |
| JP | 2013-021844 A | 1/2013 |
| JP | 2013-072429 | 4/2013 |
| WO | 2015/019948 A1 | 2/2015 |

OTHER PUBLICATIONS

Office Action dated Dec. 18, 2018 issued in corresponding CN patent application No. 201580079162.1 (and English translation).
International Search Report of the International Searching Authority dated Aug. 18, 2015 for the corresponding International application No. PCT/JP2015/066622 (and English translation).
Office Action dated Jul. 2, 2019 issued in corresponding CN patent application No. 201580079162.1 (and English translation).
Office Action dated Sep. 30, 2019 issued in corresponding In patent application No. 201747040581.
Office Action dated Oct. 21, 2019 issued in corresponding ID patent application No. PID201708607 (and English translation).
Office Action dated Oct. 14, 2019 issued in corresponding EP patent application No. 15894911.5.
Decision to refuse a European Patent application dated Oct. 30, 2020 issued in corresponding EP patent application No. 15894911.5.
The Minutes of Oral Proceedings in accordance with Rule 124(4) EPC dated Oct. 29, 2020 issued in corresponding EP patent application No. 15894911.5.

* cited by examiner

Prior Art

Prior Art

FIG.9

ELECTRIC MOTOR FOR COMPRESSOR, COMPRESSOR, AND REFRIGERATION CYCLE DEVICE

CROSS REFERENCE TO RELATED APPLICATION

This application is a U.S. national stage application of International Patent Application No. PCT/JP2015/066622 filed on Jun. 6, 2015, the disclosure of which is incorporated herein by reference.

TECHNICAL FIELD

The present invention relates to an electric motor for a compressor contained in a compressor, a compressor, and a refrigeration cycle device.

BACKGROUND

A conventional compressor described in Patent Literature 1 includes an airtight container, a compression element placed in the airtight container, and an electric motor that drives the compression element via a rotating shaft. The electric motor has a stator, and a rotor placed on an inner side of the stator and providing a rotational force to the rotating shaft. An eccentric portion is provided on the rotating shaft passing through the compression element.

PATENT LITERATURE

Patent Literature 1: Japanese Patent Application Laid-open No. 2012-231586

In the conventional electric motor described in Patent Literature 1, the stack thickness of a rotor core is formed to be equal to that of a stator core or the stack thickness of the rotor core is formed to be larger than that of the stator core. In a case where an electric motor having such a relationship between the stack thickness of the rotor core and the stack thickness of the stator core is used in a compressor, flexure caused by a centrifugal force that acts on the eccentric portion provided on the rotating shaft occurs when the rotor rotates, and the axis center of the rotor core is inclined with respect to the axis center of the stator core due to the flexure of the rotating shaft, which hinders an outer periphery portion of an end of the rotor core in the axial direction from facing an inner periphery portion of an end of the stator core in the axial direction. If there is a non-facing surface being a part where the rotor core and the stator core do not face each other in the rotor core, magnetic fluxes emitted from the non-facing surface among magnetic fluxes generated in the rotor become leakage fluxes without being taken in the end of the stator core in the axial direction and a torque corresponding to the leakage fluxes is not produced, which results in a problem that the electric motor efficiency is reduced.

It is conceivable to provide a balance weight to the rotor as a measure to prevent the flexure of the rotating shaft. However, the cost increases when a balance weight is used, and thus there is a problem that the conventional electric motor described in Patent Literature 1 cannot address a need to prevent a reduction in the electric motor efficiency caused by leakage fluxes without increasing the cost.

SUMMARY

The present invention has been achieved in view of the above problems, and an object of the present invention is to provide an electric motor for a compressor that improves the electric motor efficiency without increasing the cost.

To solve the above problems and achieve the object an electric motor for a compressor contained in the compressor according to the present invention includes: an annular stator core formed by stacking a plurality of electromagnetic steel sheets; a rotor core provided on an inner side of the stator core and formed by stacking a plurality of electromagnetic steel sheets; a rotating shaft having one end side inserted into the rotor core; and an eccentric portion provided on another end side of the rotating shaft and placed in a compression mechanism contained in the compressor. A length from a center of the rotor core in an axial direction of the rotor core to an end face of the rotor core in the axial direction of the rotor core is shorter than a length from a center of the stator core in an axial direction of the stator core to an end face of the stator core in the axial direction of the stator core.

Advantageous Effects of Invention

The present invention has an effect where it is possible to improve the electric motor efficiency without increasing the cost.

DETAILED DESCRIPTION

An electric motor for a compressor, a compressor, and a refrigeration cycle device according to the present invention will be explained in detail below with reference to the accompanying drawings. The present invention is not limited to the embodiments.

Embodiment

Figure 1:
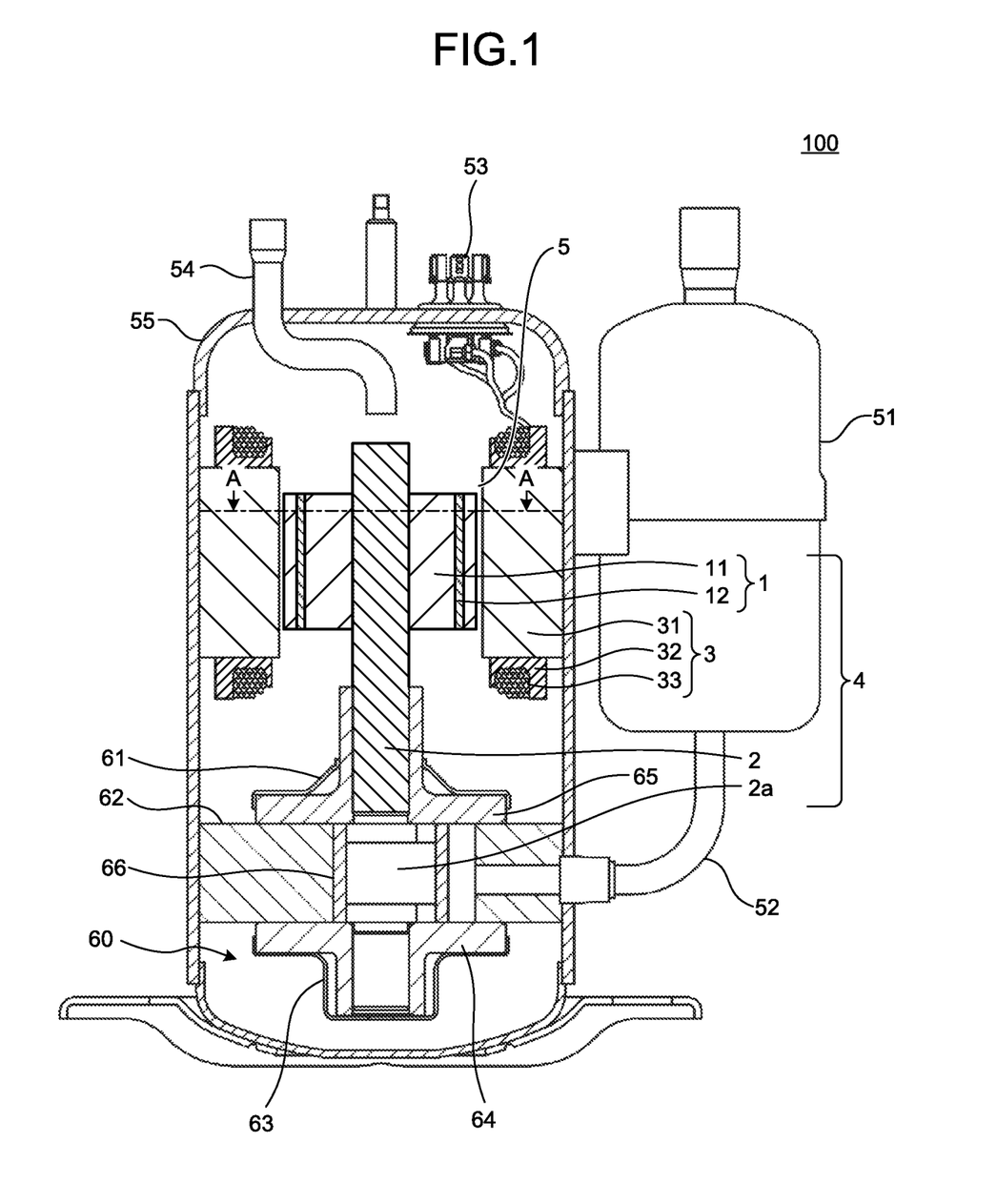
FIG. 1 is a sectional view of a compressor containing an electric motor for a compressor according to an embodiment of the present invention.

FIG. 1 is a sectional view of a compressor containing an electric motor for a compressor according to an embodiment of the present invention. A compressor 100 has an accumulator 51 that separates a refrigerant gas supplied from an evaporator (not illustrated) and a remaining liquid refrigerant from each other, a compression mechanism 60 that is installed in an airtight container 55 and compresses a refrigerant gas supplied from the accumulator 51 via an intake pipe 52, and an electric motor 4 being an electric motor for a compressor, which is installed in the airtight container 55 and drives the compression mechanism 60.

The electric motor 4 includes a stator 3 and a rotor 1. The stator 3 includes: a stator core 31 that is formed by stacking a plurality of core pieces that are stamped out from an electromagnetic-steel-sheet base material being an electromagnetic steel sheet and that is held on an inner periphery portion of the airtight container 55; an insulating portion 32; and a winding wire 33 that is wound on the stator core 31 by a concentrated winding method or a distributed winding method with the insulating portion 32 interposed therebetween and that is supplied with power from a glass terminal 53 fixed to the airtight container 55. The rotor 1 includes a rotor core 11 that is formed by stacking a plurality of core pieces stamped out from an electromagnetic-steel-sheet base material and that is placed on an inner side of the stator core 31 with a clearance 5 interposed therebetween, and a plurality of permanent magnets 12 embedded in the rotor core 11.

The permanent magnets 12 are fixed to the rotor core 11. As examples of a fixing method of the permanent magnets 12, methods such as press-fitting the permanent magnets 12 into magnet insertion holes formed in the rotor core 11 or applying an adhesive on the permanent magnets 12 and then inserting the permanent magnets 12 into the magnet insertion holes formed in the rotor core 11 are conceivable. In a general rotor core, end plates that prevent permanent magnets from slipping out in the axial direction are placed on one end face and the other end face in the axial direction. However, no end plate is used in the electric motor 4 according to the present embodiment. While the length of the permanent magnets 12 in the axial direction is equal to the stack thickness of the rotor core 11 in the illustrated example, the length of the permanent magnets 12 in the axial direction may be shorter or longer than the stack thickness of the rotor core 11. The stack thickness of the rotor core 11 is the thickness of a stack of the core pieces for the rotor core 11, which are stamped out from an electromagnetic-steel-sheet base material. The permanent magnets 12 may be either ferrite magnets or rare-earth magnets.

The compression mechanism 60 includes: a cylinder 62 that is fixed to an inner part of the airtight container 55 and to which a refrigerant gas is supplied from the accumulator 51; an upper frame 65 to which the other end side of a rotating shaft 2 is inserted to close one end of the cylinder 62 in the axial direction; an upper discharge muffler 61 attached to the upper frame 65; a lower frame 64 that closes the other end of the cylinder 62 in the axial direction; a lower discharge muffler 63 attached to the lower frame 64; and a piston 66 that is placed in the cylinder 62 and performs eccentric-rotational movement in the cylinder 62 along with an eccentric portion 2a of the rotating shaft 2.

One end side of the rotating shaft 2 is inserted into the rotor core 11 and the other end side of the rotating shaft 2 passes through an inner space of the cylinder 62 to be held by the upper frame 65 and the lower frame 64 in a state capable of rotating. The eccentric portion 2a that compresses a refrigerant along with the piston 66 is formed on the other end side of the rotating shaft 2.

An operation of the compressor 100 when the electric motor 4 is rotating will be described. A refrigerant gas supplied from the accumulator 51 is taken in the cylinder 62 through the intake pipe 52 fixed to the airtight container 55, and the rotor 1 is rotated by energization of an inverter (not illustrated), so that the eccentric portion 2a provided on the rotating shaft 2 rotates in the cylinder 62 and accordingly the piston 66 compresses the refrigerant. A compressed high-temperature refrigerant passes through the upper discharge muffler 61 and the lower discharge muffler 63, then moves upward in the airtight container 55 through the clearance 5 between the rotor 1 and the stator 3, and is supplied to a high-pressure side of a refrigeration cycle through a discharge pipe 54 provided in the airtight container 55.

Figure 2:
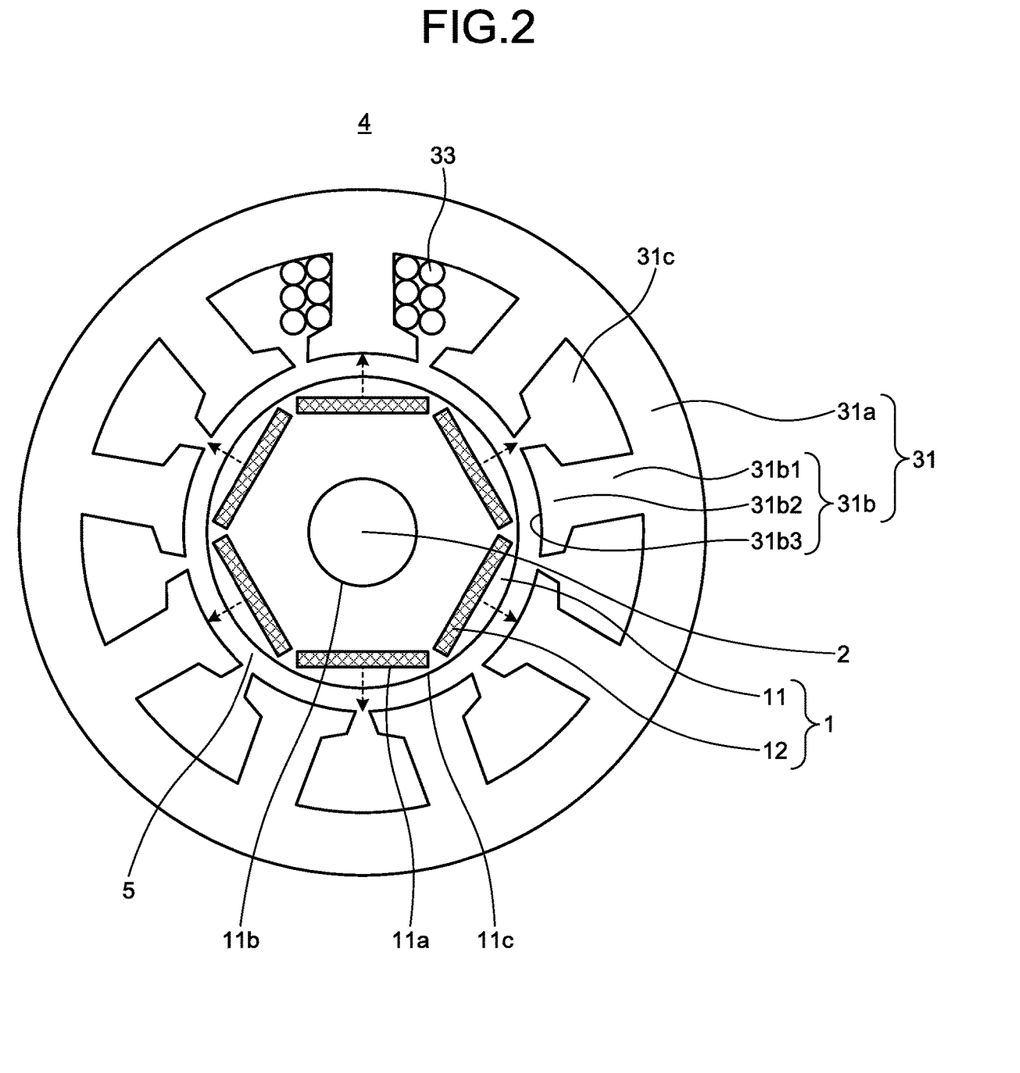
FIG. 2 is a sectional view of the electric motor illustrated in FIG. 1 as viewed in a direction of arrows A-A.

FIG. 2 is a sectional view of the electric motor illustrated in FIG. 1 as viewed in a direction of arrows A-A. The stator core 31 includes an annular back yoke 31a, and a plurality of teeth 31b provided on an inner periphery portion of the back yoke 31a at regular intervals in a rotational direction and extending toward the center of the back yoke 31a. The "rotational direction" is a direction of rotation of the rotor 1. Each of the teeth 31b includes a winding portion 31b1 that is fixed to the back yoke 31a and on which the winding wire 33 is wound, and an end portion 31b2 that is formed on an end side of the winding portion 31b1 and has a rotor facing surface 31b3 formed in an umbrella shape. A plurality of slots 31c that are each defined by the back yoke 31a and the teeth 31b and that house therein the winding wire 33 are formed on the stator core 31 thus configured. While nine teeth 31b are formed on the back yoke 31a in the illustrated example, the number of the teeth 31b is not limited thereto.

A plurality of magnet insertion holes 11a provided at regular intervals in the rotational direction to correspond to the number of magnetic poles, and a rotating-shaft insertion hole 11b that is formed at the center of the rotor core 11 in the radial direction and to which the rotating shaft 2 is inserted are formed on the rotor core 11. A sectional shape of the magnet insertion holes 11a is a rectangle with a width in the radial direction narrower than a width in the rotational direction, and the magnet insertion holes 11a extend in the axial direction and pass through the rotor core 11 from one end to the other end. Permanent magnets 12 with polarities different from each other are inserted into adjacent ones of the magnet insertion holes 11a, and the permanent magnets 12 respectively inserted into the magnet insertion holes 11a have flat plate shapes alternately magnetized with N poles and S poles. In the electric motor 4 thus configured, the winding wire 33 is energized with a current at a frequency synchronized with an instructed number of rotations, whereby a rotating magnetic field is generated and the rotor 1 rotates. While six permanent magnets 12 are inserted into the rotor core 11 in the illustrated example, the number of the permanent magnets 12 is not limited to that in the illustrated example. Furthermore, while an IPM (Interior Permanent Magnet) electric motor 4 is used for the compressor 100 in the present embodiment, an electric motor of a type other than the IPM type may be used for the compressor 100.

Figure 3:
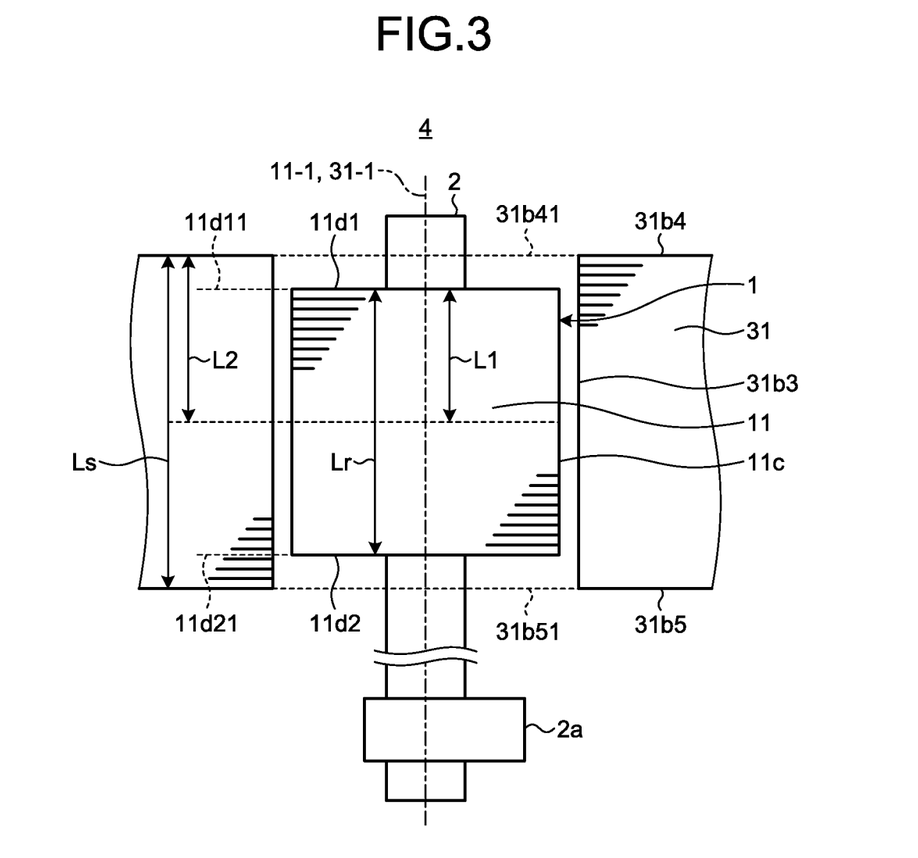
FIG. 3 is a side view illustrating a state of a rotor core, a stator core, and a rotating shaft in a case where an operation of the electric motor illustrated in FIG. 1 is stopped.

FIG. 3 is a side view illustrating a state of the rotor core, the stator core, and the rotating shaft in a case where the operation of the electric motor illustrated in FIG. 1 is stopped. In FIG. 3, illustrations of the insulating portion 32 and the winding wire 33 among the constituent elements of the electric motor 4 illustrated in FIG. 1 are omitted. FIG. 3 illustrates a relationship between a stack thickness Lr of the rotor core 11 and a stack thickness Ls of the stator core 31, where the stack thickness Lr of the rotor core 11 is the thickness of a stack of a plurality of core pieces for the rotor core 11, stamped out from an electromagnetic-steel-sheet base material and the stack thickness Ls of the stator core 31 is the thickness of a stack of a plurality of core pieces for the stator core 31, stamped out from an electromagnetic-steel-sheet base material. The stack thickness Lr of the rotor core 11 is formed to be smaller than the stack thickness Ls of the stator core 31. One end face 11*d*1 of the rotor core 11 is located on a side nearer the center of the rotor core 11 in the axial direction than a position on an extension line 31*b*41 of one end face 31*b*4 of the stator core 31, and the other end face 11*d*2 of the rotor core 11 is located on a side nearer the center of the rotor core 11 in the axial direction than a position on an extension line 31*b*51 of the other end face 31*b*5 of the stator core 31. That is, assuming that the length from the center of the rotor core 11 to an end face of the rotor core 11 is L1 and the length from the center of the stator core 31 to an end face of the stator core 31 is L2, L2 is formed to be longer than L1 in the rotor core 11 and the stator core 31. When the rotor 1 is not rotating, the position of an axis center 11-1 of the rotor core 11 coincides with the position of an axis center 31-1 of the stator core 31.

Figure 4:
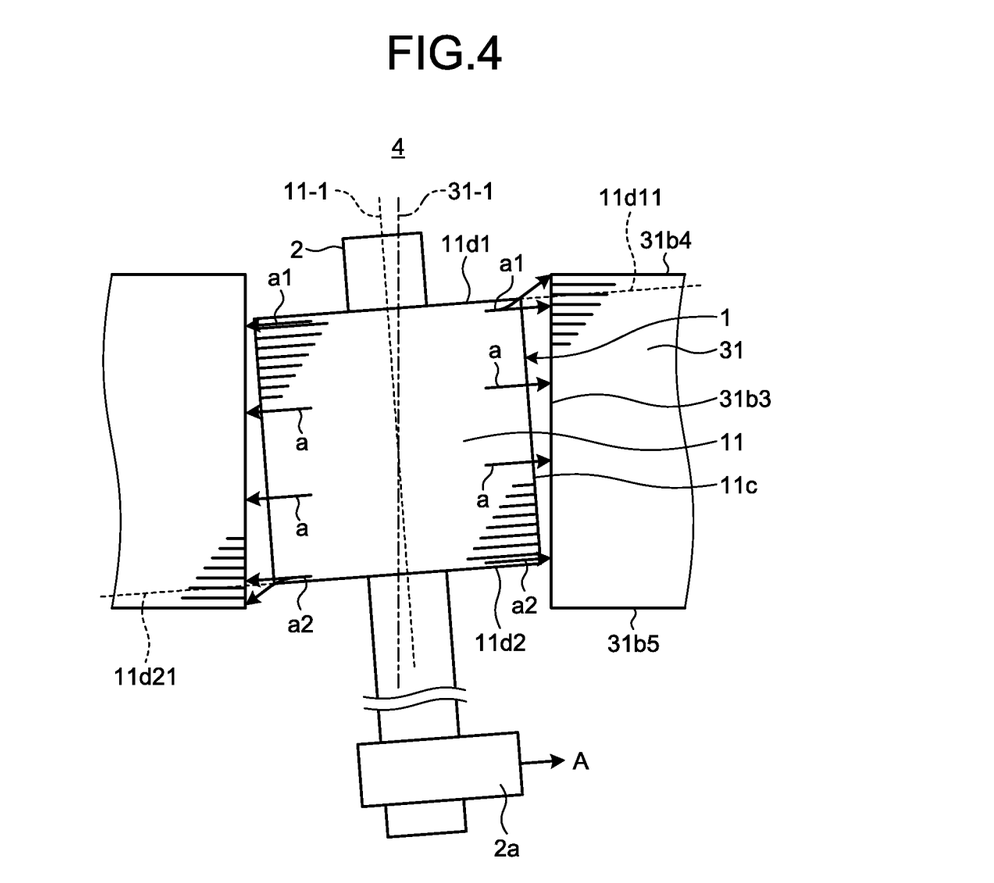
FIG. 4 is a side view illustrating a state of the rotor core, the stator core, and the rotating shaft in a case where the electric motor illustrated in FIG. 3 is in a normal operation.

FIG. 4 is a side view illustrating a state of the rotor core, the stator core, and the rotating shaft in a case where the electric motor illustrated in FIG. 3 is in a normal operation. Upon rotation of the rotor 1, flexure caused by a centrifugal force A that acts on the eccentric portion 2*a* occurs in the rotating shaft 2, and the axis center 11-1 of the rotor core 11 is inclined with respect to the axis center 31-1 of the stator core 31 due to the flexure of the rotating shaft 2. Because the stack thickness Lr of the rotor core 11 and the stack thickness Ls of the stator core 31 have a relationship Lr<Ls in the electric motor 4, the rotor facing surface 31*b*3 of the stator core 31 is located on a side nearer the center of the rotor core 11 in the axial direction than an extension line 11*d*11 of the one end face 11*d*1 of the rotor core 11 and than an extension line 11*d*21 of the other end face 11*d*2 of the rotor core 11 even when the axis center 11-1 of the rotor core 11 is inclined with respect to the axis center 31-1 of the stator core 31. Among magnetic fluxes "a" generated in the rotor 1, magnetic fluxes "a1" emitted from a corner part between an outer periphery surface 11*c* of the rotor core 11 and the one end face 11*d*1, that is, from a part of the outer periphery surface 11*c* of the rotor core 11 on the side of the one end face 11*d*1 and a part of the one end face 11*d*1 of the rotor core 11 on the side of the outer periphery surface 11*c* are taken in a part of the rotor facing surface 31*b*3 of the stator core 31 on the side of the one end face 31*b*4. Magnetic fluxes "a2" emitted from a corner part between the outer periphery surface 11*c* of the rotor core 11 and the other end face 11*d*2, that is, from a part of the outer periphery surface 11*c* of the rotor core 11 on the side of the other end face 11*d*2 and a part of the other end face 11*d*2 of the rotor core 11 on the side of the outer periphery surface 11*c* among the magnetic fluxes "a" generated in the rotor 1 are taken in a part of the rotor facing surface 31*b*3 of the stator core 31 on the side of the other end face 31*b*5.

Figure 5:
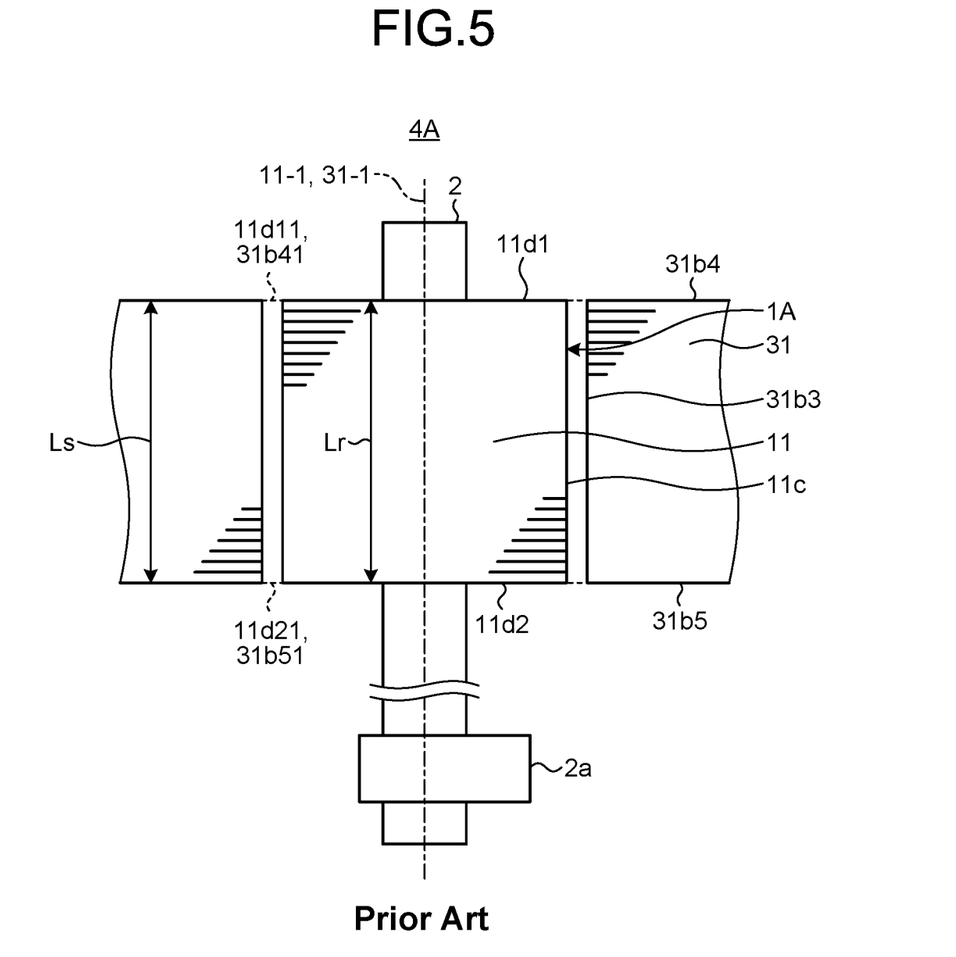
FIG. 5 is a side view illustrating a state of a rotor core, a stator core, and a rotating shaft in a case where an operation of a conventional electric motor is stopped.

FIG. 5 is a side view illustrating a state of a rotor core, a stator core, and a rotating shaft in a case where an operation of a conventional electric motor is stopped. An electric motor 4A illustrated in FIG. 5 is an example of the conventional electric motor described in Patent Literature 1 used for a compressor, where the stack thickness of the rotor core is formed to be equal to the stack thickness of the stator core or the stack thickness of the rotor core is formed to be larger than the stack thickness of the stator core. In the electric motor 4A illustrated in FIG. 5, the same portions as those in the electric motor 4 illustrated in FIG. 3 are denoted by same reference sings to omit the descriptions. In the conventional electric motor 4A, the stack thickness Lr of the rotor core 11 of a rotor 1A is formed to be equal to the stack thickness Ls of the stator core 31 or the stack thickness Lr of the rotor core 11 of the rotor 1A is formed to be larger than the stack thickness Ls of the stator core 31. The stack thickness Lr of the rotor core 11 and the stack thickness Ls of the stator core 31 in the electric motor 4A illustrated in FIG. 5 have a relationship Lr=Ls. Therefore, the one end face 11*d*1 of the rotor core 11 is located on the extension line 31*b*41 of the one end face 31*b*4 of the stator core 31 and the other end face 11*d*2 of the rotor core 11 is located on the extension line 31*b*51 of the other end face 31*b*5 of the stator core 31.

Figure 6:
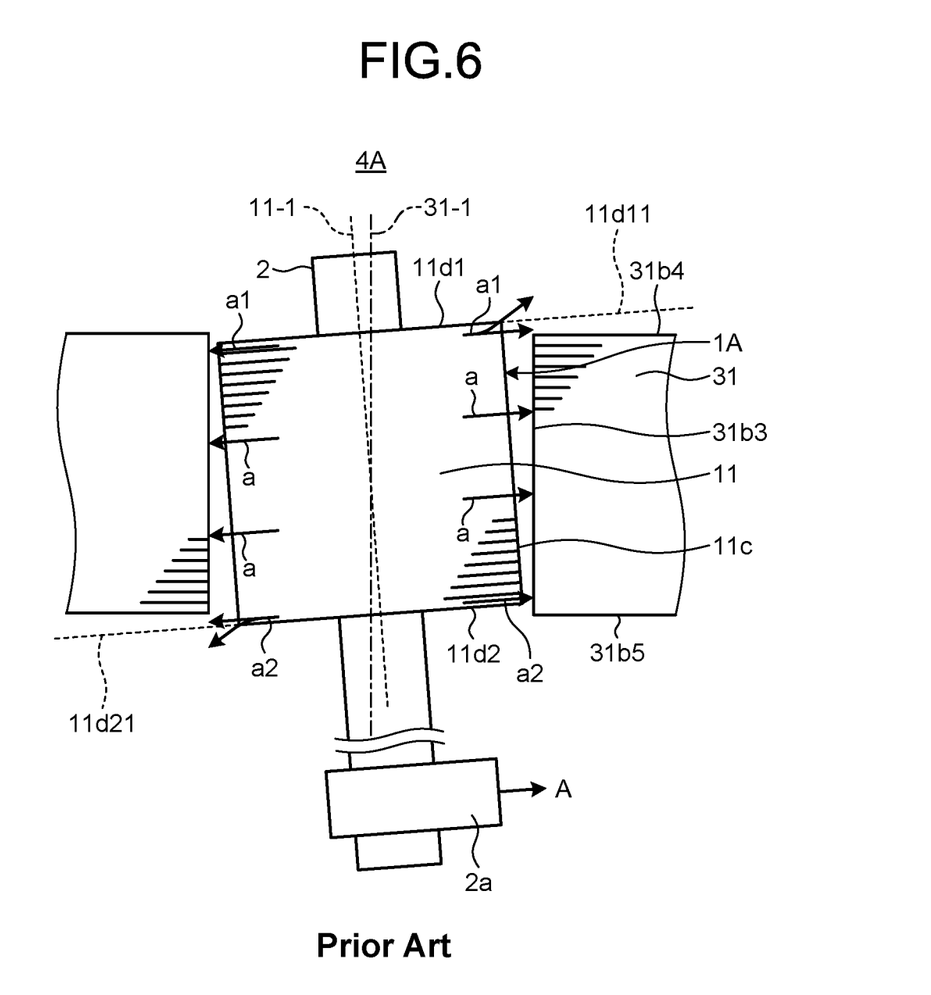
FIG. 6 is a side view illustrating a state of the rotor core, the stator core, and the rotating shaft in a case where the conventional electric motor illustrated in FIG. 5 is in a normal operation.

FIG. 6 is a side view illustrating a state of the rotor core, the stator core, and the rotating shaft in a case where the conventional electric motor illustrated in FIG. 5 is in a normal operation. Upon rotation of the rotor 1A, flexure caused by the centrifugal force A that acts on the eccentric portion 2*a* occurs in the rotating shaft 2 and the axis center 11-1 of the rotor core 11 is inclined with respect to the axis center 31-1 of the stator core 31 due to the flexure of the rotating shaft 2. Because the stack thickness Lr of the rotor core 11 and the stack thickness Ls of the stator core 31 have the relationship Lr=Ls in the electric motor 4A, the rotor facing surface 31*b*3 of the stator core 31 is not located on a side nearer the center of the rotor core 11 in the axial direction than the extension line 11*d*11 of the one end face 11*d*1 of the rotor core 11 and is not located on a side nearer the center of the rotor core 11 in the axial direction than the extension line 11*d*21 of the other end face 11*d*2 of the rotor core 11 either, when the axis center 11-1 of the rotor core 11 is inclined with respect to the axis center 31-1 of the stator core 31. The magnetic fluxes "a1" emitted from a part of the outer periphery surface 11*c* of the rotor core 11 on the side of the one end face 11*d*1 among the magnetic fluxes "a" generated in the rotor 1A and emitted from the outer periphery surface 11*c* of the rotor core 11 become leakage fluxes without being taken in a part of the rotor facing surface 31*b*3 of the stator core 31 on the side of the one end face 31*b*4. The magnetic fluxes "a2" emitted from a part of the outer periphery surface 11*c* of the rotor core 11 on the side of the other end face 11*d*2 among the magnetic fluxes "a" generated in the rotor 1A and emitted from the outer periphery surface 11*c* of the rotor core 11 also become leakage fluxes without being taken in a part of the rotor facing surface 31*b*3 of the stator core 31 on the side of the other end face 31*b*5. Therefore, a torque corresponding to the leakage fluxes becomes a factor of a reduction in the electric motor efficiency.

In the electric motor 4 according to the present embodiment, even when the axis center 11-1 of the rotor core 11 is inclined with respect to the axis center 31-1 of the stator core 31 due to the flexure of the rotating shaft 2, the leakage fluxes as illustrated in FIG. 6 can be reduced and the electric motor efficiency can be improved because the stack thickness Lr of the rotor core 11 and the stack thickness Ls of the stator core 31 have the relationship Lr<Ls.

Figure 7:
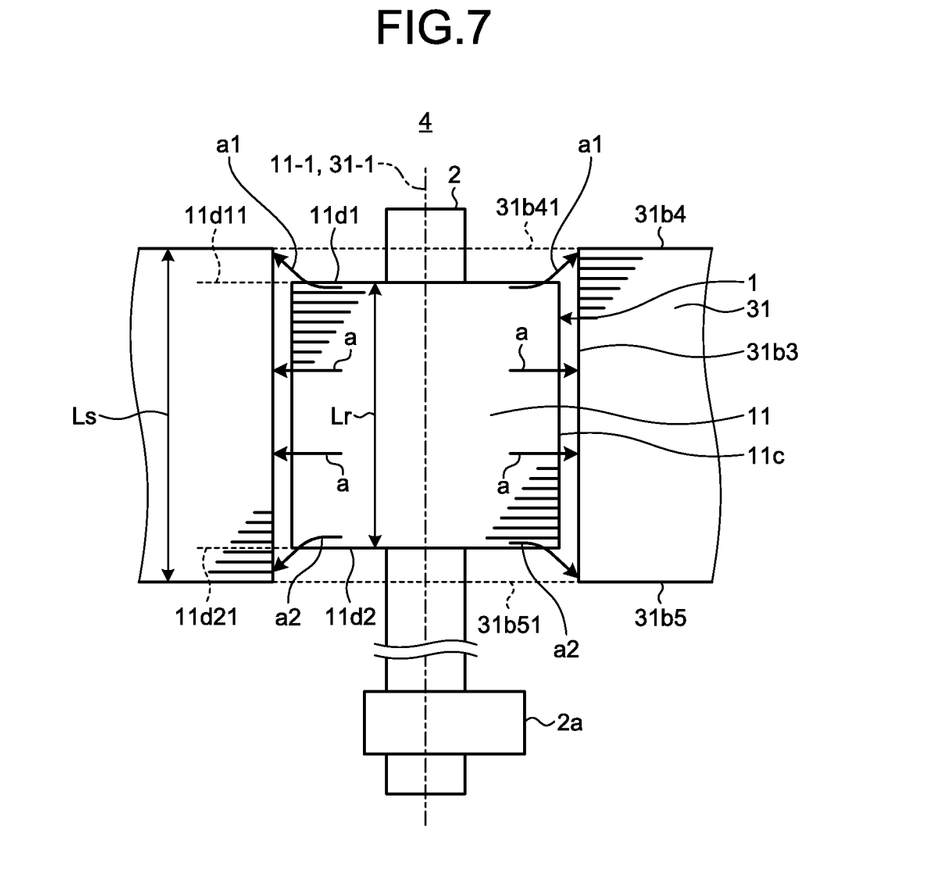
FIG. 7 is a diagram illustrating flows of magnetic fluxes when the electric motor according to the embodiment of the present invention operates at a lower speed and a higher torque than in a normal operation.

FIG. 7 is a diagram illustrating flows of magnetic fluxes when the electric motor according to the embodiment of the present invention operates at a lower speed and a higher torque than in the normal operation. When the electric motor 4 operates at a lower speed and a higher torque than in the normal operation, the centrifugal force A acting on the eccentric portion 2*a* is lower than that in the normal operation and thus the flexure of the rotating shaft 2 caused by the centrifugal force A is also reduced. Therefore, the inclination of the axis center 11-1 of the rotor core 11 with respect to the axis center 31-1 of the stator core 31 is smaller than that in the normal operation. In FIG. 7, it is assumed that the position of the axis center 11-1 of the rotor core 11 when the electric motor 4 is operating at a lower speed and a higher torque than in the normal operation coincides with the position of the axis center 31-1 of the stator core 31 to simplify the descriptions.

Meanwhile, a magnetic flux density at a part where the stator core 31 and the rotor core 11 face each other when the electric motor 4 is operating at a lower speed and a higher torque than in the normal operation is higher than that in the normal operation, and thus there is a concern regarding magnetic saturation.

Because the stack thickness Lr of the rotor core 11 and the stack thickness Ls of the stator core 31 have the relationship Lr<Ls in the electric motor 4 according to the present embodiment, parts in the rotor facing surface 31$b$3 other than the part where the stator core 31 and the rotor core 11 face each other, that is, a part of the rotor facing surface 31$b$3 on the side of the one end face 31$b$4 and a part thereof on the side of the other end face 315$b$ have a magnetic flux density lower than that in the facing part between the stator core 31 and the rotor core 11 even when magnetic saturation occurs in the facing part between the stator core 31 and the rotor core 11. Therefore, the magnetic fluxes "a1" emitted from the corner part between the outer periphery surface 11$c$ of the rotor core 11 and the one end face 11$d$1 among the magnetic fluxes "a" generated in the rotor 1 are taken in the part of the rotor facing surface 31$b$3 on the side of the one end face 31$b$4 where the magnetic flux density is lower than that in the part where the stator core 31 and the rotor core 11 face each other. Similarly, the magnetic fluxes "a2" emitted from the corner part between the outer periphery surface 11$c$ of the rotor core 11 and the other end face 11$d$2 among the magnetic fluxes "a" generated in the rotor 1 are taken in the part of the rotor facing surface 31$b$3 on the side of the other end face 31$b$5 where the magnetic flux density is lower than in the part where the stator core 31 and the rotor core 11 face each other. As a result, suppression of a reduction in the electric motor efficiency is expected also under a circumstance where the electric motor 4 is operating at a lower speed and a higher torque than in the normal operation.

Figure 8:
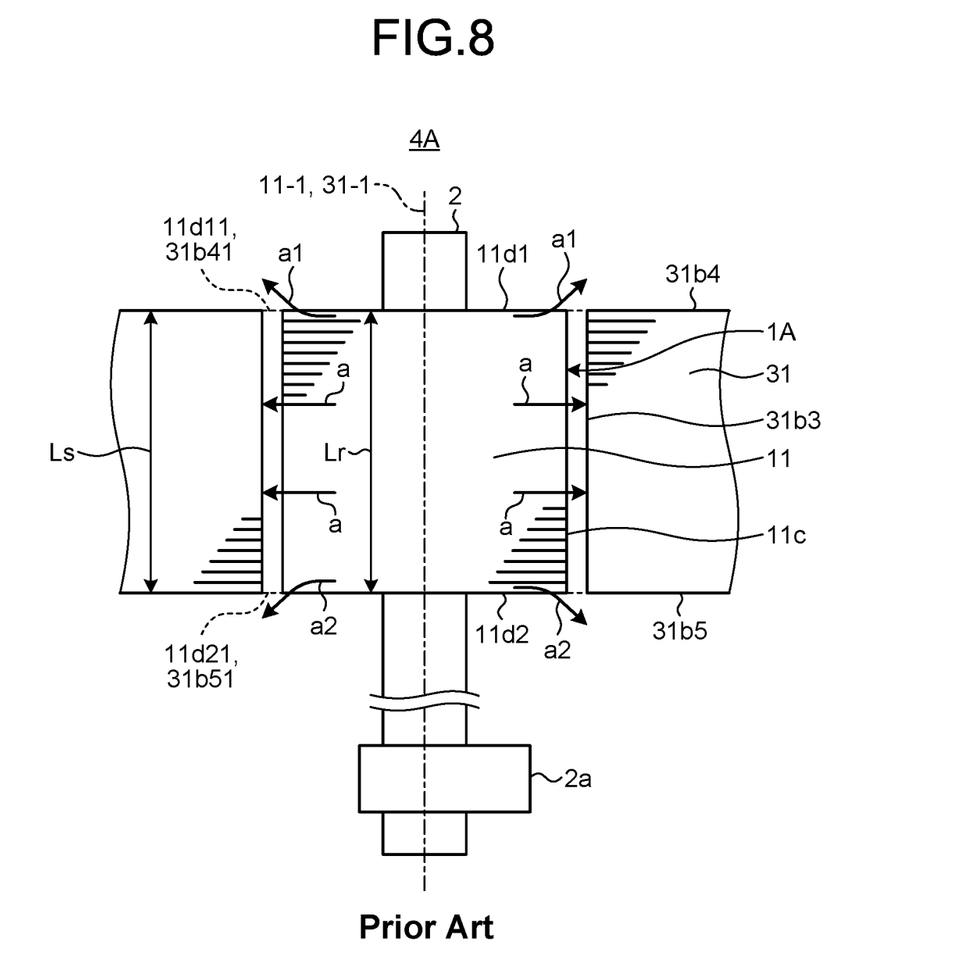
FIG. 8 is a diagram illustrating flows of magnetic fluxes in a case where the conventional electric motor illustrated in FIG. 5 operates at a lower speed and a higher torque than in a normal operation.

FIG. 8 is a diagram illustrating flows of magnetic fluxes in a case where the conventional electric motor illustrated in FIG. 5 operates at a lower speed and a higher torque than in a normal operation. In the electric motor 4A, the stack thickness Lr of the rotor core 11 and the stack thickness Ls of the stator core 31 have the relationship Lr=Ls. Accordingly, when magnetic saturation occurs in the facing part between the stator core 31 and the rotor core 11, the magnetic fluxes "a1" emitted from the corner part between the outer periphery surface 11$c$ and the one end face 11$d$1 among the magnetic fluxes "a" generated in the rotor 1A become leakage fluxes without being taken in the part where the stator core 31 and the rotor core 11 face each other, that is, the rotor facing surface 31$b$3. Similarly, the magnetic fluxes "a2" emitted from the corner part between the outer periphery surface 11$c$ of the rotor core 11 and the other end face 11$d$2 among the magnetic fluxes "a" generated in the rotor 1A become leakage fluxes without being taken in the part where the stator core 31 and the rotor core 11 face each other. The leakage fluxes become a factor of a reduction in the electric motor efficiency under a circumstance where the electric motor 4A is operating at a lower speed and a higher torque than in the normal operation.

As described above, the electric motor according to the present embodiment is an electric motor for a compressor, contained in the compressor and includes an annular stator core formed by stacking a plurality of electromagnetic steel sheets, a rotor core placed on an inner side of the stator core and formed by stacking a plurality of electromagnetic steel sheets, a rotating shaft having one end side inserted into the rotor core, and an eccentric portion provided on the other end side of the rotating shaft and placed in a compression mechanism contained in the compressor, in which the length from the center of the rotor core in an axial direction of the rotor core to an end face of the rotor core in the axial direction of the rotor core is shorter than the length from the center of the stator core in an axial direction of the stator core to an end face of the stator core in the axial direction of the stator core. Due to this configuration, leakage fluxes can be reduced and the electric motor efficiency can be improved even when an axis center of the rotor core is inclined with respect to an axis center of the stator core due to flexure of the rotating shaft.

Figure 9:
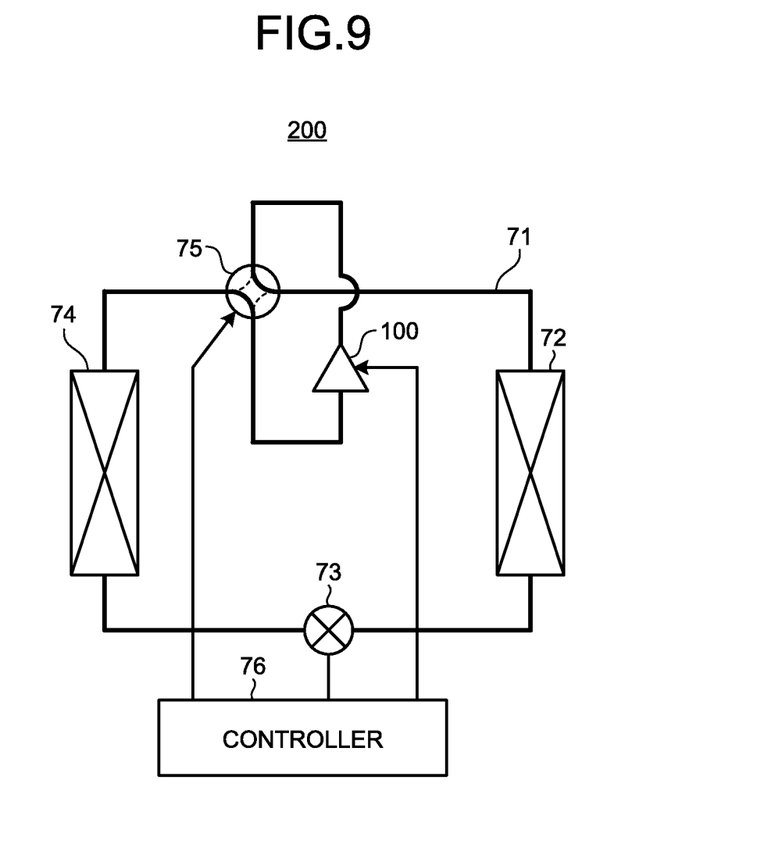
FIG. 9 is a configuration diagram of a refrigeration cycle device having a compressor according to the embodiment of the present invention mounted thereon.

FIG. 9 is a configuration diagram of a refrigeration cycle device having the compressor according to the embodiment of the present invention mounted thereon. A refrigeration cycle device 200 includes the compressor 100, a four-way valve 75, a condenser 72 that performs heat exchange between a high-temperature and high-pressure refrigerant gas compressed by the compressor 100 and air to condense the refrigerant gas to a liquid refrigerant, an expander 73 that expands the liquid refrigerant to a low-temperature and low-pressure liquid refrigerant, an evaporator 74 that absorbs heat from the low-temperature and low-pressure liquid refrigerant to obtain a low-temperature and low-pressure gas refrigerant, and a controller 76 that controls the compressor 100, the expander 73, and the four-way valve 75. The compressor 100, the four-way valve 75, the condenser 72, the expander 73, and the evaporator 74 are connected via a refrigerant pipe 71 to form a refrigeration cycle. Use of the compressor 100 can provide the refrigeration cycle device 200 with a high efficiency and a high output. The refrigeration cycle device 200 is suitable for an air conditioner, for example.

An operation thereof is described below. In a normal operation of the refrigeration cycle device 200, a refrigeration cycle in which a refrigerant circulates through the compressor 100, the condenser 72, the expander 73, and the evaporator 74 in this order to return to the compressor 100 is performed. A high-temperature and high-pressure refrigerant gas compressed by the compressor 100 exchanges heat with air in the condenser 72 to condense to a liquid refrigerant. The liquid refrigerant expands in the expander 73 to a low-temperature and low-pressure refrigerant gas, which exchanges heat with air to evaporate in the evaporator 74 and is compressed again in the compressor 100 to become a high-temperature and high-pressure refrigerant gas.

By thus using the compressor 100 according to the embodiment of the present invention, the refrigeration cycle device 200 that can achieve low vibration and low noise while suppressing the cost can be provided.

The configurations described in the above embodiments are only examples of the content of the present invention. The configurations can be combined with other well-known techniques, and a part of each configuration can be omitted or modified without departing from the scope of the present invention.

The invention claimed is:

1. An electric motor for a compressor contained in the compressor and comprising:

an annular stator core that has a first end face and a second end face formed by stacking a plurality of electromagnetic steel sheets;

a rotor core provided on an inner side of the annular stator core and having a first end face and a second end face formed by stacking a plurality of electromagnetic steel sheets;

a rotating shaft having a first end side inserted into the rotor core; and an eccentric portion provided on a second end side of the rotating shaft and placed in a compression mechanism contained in the compressor, wherein a first length from a center of the rotor core in an axial direction of the rotor core to a first end face of the rotor core in the axial direction of the rotor core is shorter than a second length from a center of the annular stator core in an axial direction of the annular stator core to a first end face of the annular stator core in the axial direction of the annular stator core such that leakage flux is reduced during a normal operation in which the axial direction of the rotor core is tilted with respect to the axial direction of the annular stator core due to flexure caused by a centrifugal force that acts on the eccentric portion, wherein the first end face of the rotor core is located closer to the center of the rotor core than an extension line of the first end face of the annular stator core is to the center of the rotor core during the normal operation, and a second end face of the rotor core is located closer to the center of the rotor core than an extension line of the second end face of the annular stator core is to the center of the rotor core during the normal operation.

2. The compressor comprising the electric motor according to claim 1.

3. A refrigeration cycle device comprising the compressor according to claim 2.

4. The electric motor for the compressor according to claim 1, wherein the first length of the rotor core is shorter than the second length of the annular stator core by an effective amount to reduce leakage fluxes while the axial direction of the rotor core is tilted with respect to the axial direction of the annular stator core during the normal operation.

5. The electric motor for the compressor according to claim 1, wherein the first length of the rotor core is shorter than the second length of the annular stator core such that all corners of the rotor core are located between the extension line of the first end face of the annular stator core and the extension line of the second end face of the annular stator core during the normal operation in which the axial direction of the rotor core is tilted with respect to the axial direction of the annular stator core.

6. The electric motor for a compressor according to claim 1, wherein the compression mechanism includes:

a cylinder fixed to an inner part of an airtight container and to which a refrigerant gas is supplied from an accumulator;

an upper frame to which the second end side of the rotating shaft is inserted to close a first end of the cylinder in the axial direction; and a lower frame to close a second end of the cylinder in the axial direction, wherein the second end side of the rotating shaft is rotatably supported by the upper frame and the lower frame.

* * * * *